(No Model.)

W. P. JENCKS.
DRIVING MECHANISM FOR BICYCLES OR SIMILAR VEHICLES.

No. 523,964. Patented July 31, 1894.

Witnesses:
Harry J. Garceau.
John S. Lynch.

Inventor:
Walter P. Jencks
By S. Scholfield
Atty.

UNITED STATES PATENT OFFICE.

WALTER P. JENCKS, OF LAKEWOOD, ASSIGNOR TO HIMSELF, AND GEORGE L. VOSE, OF PROVIDENCE, RHODE ISLAND.

DRIVING MECHANISM FOR BICYCLES OR SIMILAR VEHICLES.

SPECIFICATION forming part of Letters Patent No. 523,964, dated July 31, 1894.

Application filed May 22, 1894. Serial No. 512,101. (No model.)

*To all whom it may concern:*

Be it known that I, WALTER P. JENCKS, a citizen of the United States, residing at Lakewood, in the county of Providence and State of Rhode Island, have invented a new and useful Improvement in Driving Mechanism for Bicycles or Similar Vehicles, of which the following is a specification.

The object of my invention is to provide a pedal movement which will apply the power of the rider to great advantage in propelling the vehicle, and it consists in the employment of pedal levers connected with oppositely moving cranks secured upon connectedly driven shafts, the said pedal levers being without a fixed fulcrum, as hereinafter fully set forth.

Figure 1:
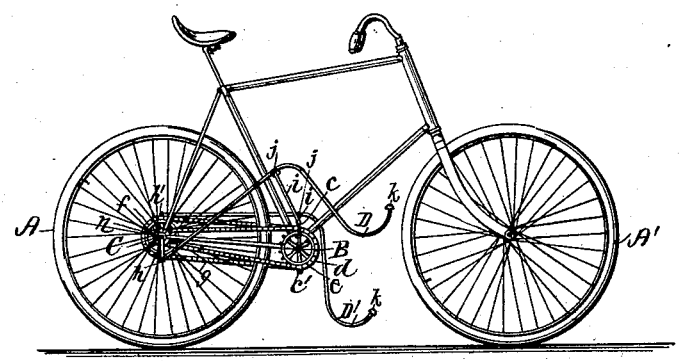
Figure 2:
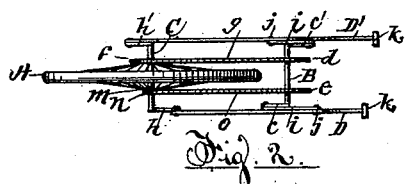
Figure 3:
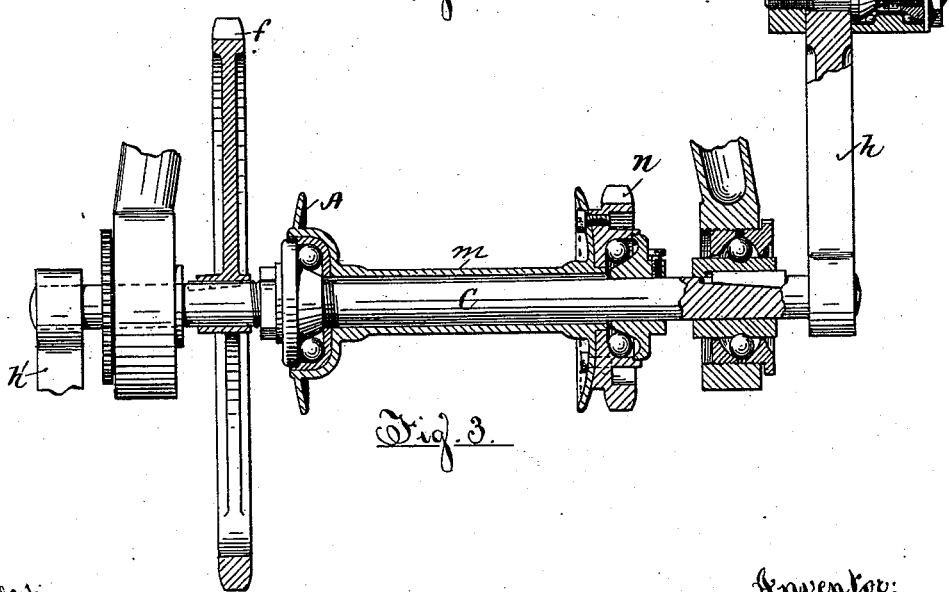

In the accompanying drawings: Figure 1, represents a side elevation of a bicycle embodying my invention. Fig. 2, represents a detail top view of the pedal movement. Fig. 3, represents an enlarged section taken through the axis of the driving wheel.

In the drawings, A represents the rear or driving wheel of a bicycle, and A', the front or steering wheel. The crank shaft B is provided with the opposite cranks $c$, $c'$, and with the sprocket wheels $d$ and $e$, and from the sprocket wheel $d$ connection is made with the corresponding sprocket wheel $f$ upon the shaft C, by means of the chain $g$, so that the two shafts B and C will revolve in unison with each other. The shaft C is provided with the oppositely arranged cranks $h$, $h'$, which are made of the same length as that of the cranks $c$, $c'$, upon the shaft B. The pedal levers D, D', are pivoted at their rear ends to the cranks $h$, $h'$, and are also connected with the cranks $c$, $c'$, by means of the connecting links $i$, $i$, which are jointed to the pedal levers at the points $j$, $j$, the cranks $c$ and $h$ and $c'$ and $h'$, being arranged at the opposite sides of their respective shafts, so that a downward pressure upon the pedal $k$ of the pedal lever D will serve to apply turning pressure to both of the cranks $c$ and $h$ without the employment of a stationary fulcrum as in the ordinary lever pedal movements, the pedal levers D, D', being arranged to act upon both of the cranks $c$ and $h$, and $c'$ and $h'$ respectively while at the same time, the shafts B and C are caused to revolve in unison with each other by means of the sprocket wheels $d$ and $f$ and the chain $g$. The hub $m$ of the wheel A is made hollow to receive the shaft C and to rotate thereon, and to one side of the hub $m$ is secured the sprocket wheel $n$, which is made of less diameter than that of the sprocket wheel $e$ upon the shaft B, and driving connection is made from the sprocket wheel $e$ upon the driving shaft B to the sprocket wheel $n$ upon the hub of the wheel A, by means of the chain $o$, thus causing the wheel A to be driven at a greater rate of speed than that of the shaft C, and in the same direction.

By the employment of my improved pedal motion the entire power of the rider is utilized upon the cranks in propelling the bicycle, the pedal levers being entirely supported by the cranks, without a connection with a stationary bearing fulcrum, and the dead center of the ordinary double crank movement is avoided so that my improved attachment constitutes a valuable invention for the economical application of foot power.

I claim as my invention—

1. The combination with the connectedly driven crank-shafts, each provided with oppositely arranged cranks, of the levers jointed at their rear ends to the oppositely directed cranks of one shaft, and connected with the oppositely directed cranks of the other shaft, by means of the connecting links, substantially as described.

2. The combination with the connectedly driven crank-shafts, each provided with oppositely arranged cranks, and the levers jointed at their rear ends to the oppositely directed cranks of one shaft, and connected with the oppositely directed cranks of the other shaft by means of the connecting links, of the driving wheel, and means for actuating the driving wheel from one of the crank shafts, substantially as described.

WALTER P. JENCKS.

Witnesses:
SOCRATES SCHOLFIELD,
HARRY J. GARCEAU.